(12) United States Patent
McGrath

(10) Patent No.: US 12,151,895 B1
(45) Date of Patent: Nov. 26, 2024

(54) SYSTEMS AND METHODS FOR THROTTLING OF BULK MATERIAL ON CONVEYORS

(71) Applicant: Amazon Technologies, Inc., Seattle, WA (US)

(72) Inventor: Joseph McGrath, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 939 days.

(21) Appl. No.: 17/191,055

(22) Filed: Mar. 3, 2021

(51) Int. Cl.
*B65G 11/08* (2006.01)
*B65G 43/00* (2006.01)

(52) U.S. Cl.
CPC ........... *B65G 11/083* (2013.01); *B65G 43/00* (2013.01)

(58) Field of Classification Search
CPC .... B65G 11/083; B65G 43/00; B65G 11/023; B65G 47/00; B65G 17/00; B65G 2812/00
See application file for complete search history.

(56) References Cited

U.S. PATENT DOCUMENTS

| | | | | | |
|---|---|---|---|---|---|
| 5,249,690 | A | * | 10/1993 | Patterson | B03B 9/06 209/703 |
| 5,701,989 | A | * | 12/1997 | Boone | B65G 47/684 198/786 |
| 2014/0262686 | A1 | * | 9/2014 | Schroader | B65G 47/22 198/454 |
| 2020/0324974 | A1 | * | 10/2020 | Gorman | G07F 9/105 |
| 2020/0361714 | A1 | * | 11/2020 | Schroader | B65G 13/10 |
| 2021/0171291 | A1 | * | 6/2021 | Green | B65G 47/64 |
| 2021/0269255 | A1 | * | 9/2021 | Montgomery, III | G06Q 10/08355 |

FOREIGN PATENT DOCUMENTS

| | | | | |
|---|---|---|---|---|
| AU | 2020446353 A1 | * | 11/2022 | ........... B65G 1/0485 |
| CN | 216420218 U | * | 5/2022 | |
| DE | 60009110 T2 | * | 8/2004 | |

\* cited by examiner

*Primary Examiner* — Jacob S. Scott
*Assistant Examiner* — Erin Morris
(74) *Attorney, Agent, or Firm* — Eversheds Sutherland (US) LLP

(57) ABSTRACT

Systems, methods, and computer-readable media are disclosed for passive throttling of bulk material on conveyor systems. In one embodiment, an example system may include a first conveyor having a first width, a second conveyor having a second width, the second conveyor disposed adjacent to the first conveyor, a third conveyor disposed adjacent to the second conveyor, a chute, and a fourth conveyor. Items falling from the second conveyor may be guided to the fourth conveyor via the chute. The first conveyor, the second conveyor, and the third conveyor may move in a first direction, and the fourth conveyor may move in a second direction.

18 Claims, 7 Drawing Sheets

SYSTEMS AND METHODS FOR THROTTLING OF BULK MATERIAL ON CONVEYORS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. For example, processing of bulk material, such as packages, may be difficult to process efficiently. In some instances, bulk materials may be inbound at a facility in large amounts, which may cause downstream delays due to overloading if the bulk materials are not sufficiently spaced or throttled. Accordingly, improvements in various operations of order fulfillment, such as improvements to bulk throttling, may be desired.

Figure 1:
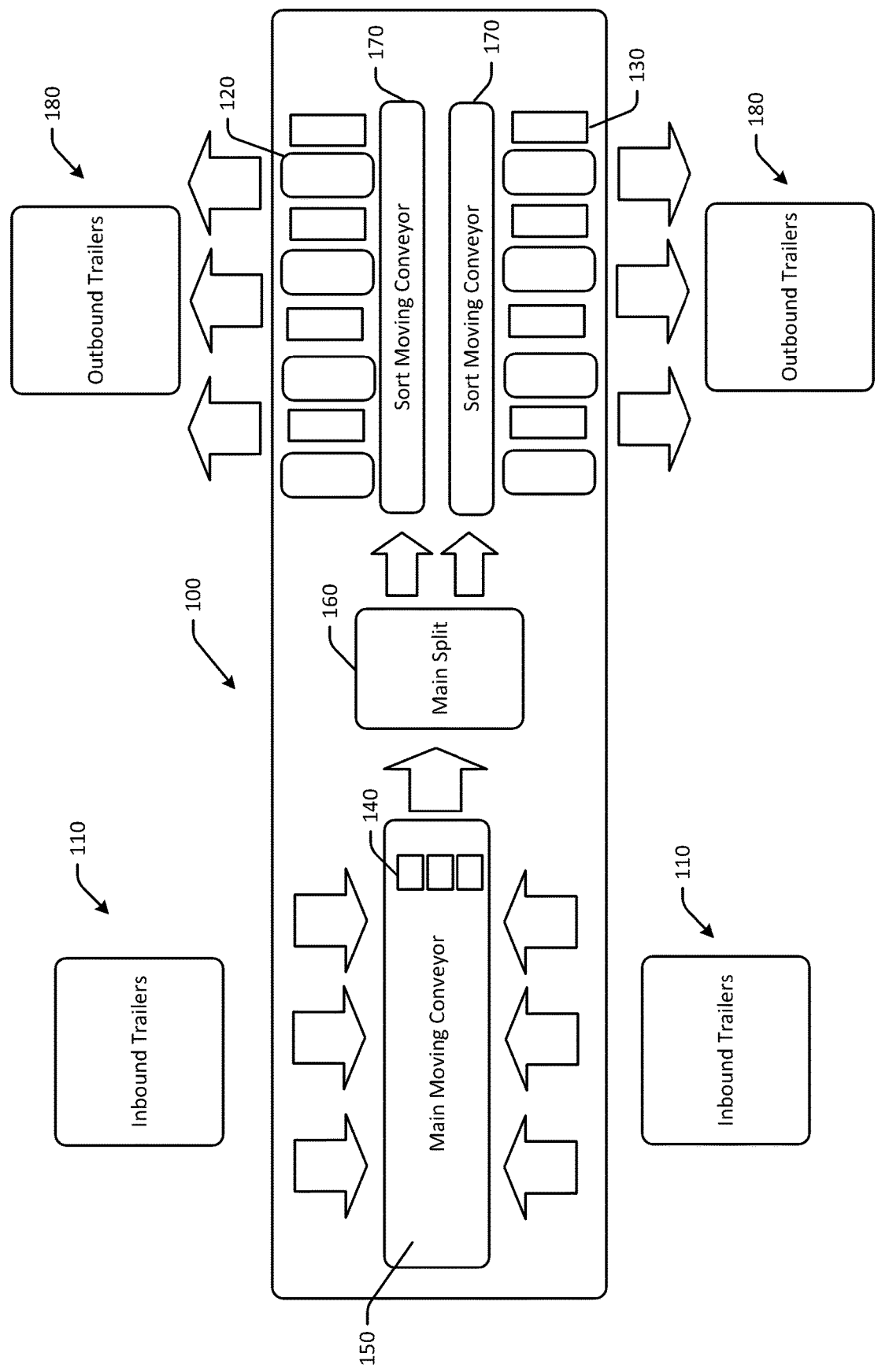
FIG. 1 is a hybrid schematic illustration of an example use case for passive throttling of bulk material on conveyor systems in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. Further, once items are packed into packages, the packages may be handled as bulk materials. Movement and transportation of bulk materials, such as packages, may be in batches or bulk. For example, a truckload of packages may be unloaded at the dock of a sortation facility. Because the amount of packages (or other bulk material) may be high, downstream processes, such as sortation or singulation of packages, may be overloaded. Accordingly, systems and methods to control the flow of bulk materials may be desired. In addition, passive systems that throttle or otherwise control the flow of bulk materials may be desired, as such systems may have reduced complexity and may be cheaper to implement and maintain relative to actively controlled systems.

Moving items, such as packages or other objects, in bulk quantities through a fulfillment center may cause overloading of certain processes, such as sortation of items, singulation or separation of items, and so forth. Some processes may be performed manually by humans, while other processes may be performed using robots or with robotic assistance. In either instance, overloading may occur and may cause further downstream delays. To prevent overloading, the flow of bulk items may be throttled.

Embodiments of the disclosure include systems and methods for throttling of bulk material on conveyor systems that may improve processing and fulfillment of orders, or other fulfillment tasks. Certain embodiments include passive systems to throttle bulk material flow, and other embodiments include active systems to throttle bulk material flow. Some embodiments include an arrangement of conveyors, chutes, and a plow that passively throttle the flow of bulk material on a conveyor system. For example, in a package sortation facility, an inbound process may be unregulated, and overfeeding of a system may have negative consequences. Embodiments may be used to passively throttle the flow of items to a maximum that can be handled by downstream processes. Some embodiments include optimized process flows for processing of orders at fulfillment centers, as well as process flows or methods to increase speed of processing items in bulk amounts as a result of improved control over the flow of items. As a result, throughput of fulfillment centers may be improved, and/or logistics of fulfillment center operations may be less complicated. Some embodiments may be configured to limit the flow (e.g., restrict the number of packages/minute, etc.) across a variety of infeed scenarios. Certain embodiments include active bulk throttling systems that utilize one or more sensors to monitor, analyze, and adjust conveyance speeds such that the system is not overfed or overloaded.

Referring to FIG. 1, an example use case for passive throttling of bulk material on conveyor systems is depicted in accordance with one or more embodiments of the disclosure. Although discussed in the context of online orders, other embodiments may be directed to any suitable use case where a flow of items can be regulated, such as instances where packages are inbound at a facility, and so forth.

In FIG. 1, a sortation center 100 may include a number of inbound trailers 110 that may deliver packages and/or other items to the sortation center 100. Items 140 may be unloaded from the inbound trailers 110 in a fluid unload and/or Gaylord dump manner onto a main moving conveyor 150 for downstream processing in the sortation center 100. The main moving conveyor 150 may transport items 140 to a main split 160, at which the items 140 may be routed onto one or more sort moving conveyors 170. The sort moving conveyors 170 may transport the respective items to particular areas within the sortation center 100, such as to individual conveyors 120 that may run transverse to the sort moving conveyors 170 and may guide items to destination gaylords, bags, pallets, or other containers 130. When aggregated and/or otherwise sorted, the gaylords, bags, pallets, or other containers 130 may be routed to outbound trailers 180 for transport out of the sortation center.

One or more conveyors 120 may be disposed about the sortation center 120. For example, conveyors 120 may be disposed along sides of the sort moving conveyors 170. The conveyors 120 may run adjacent to the various destinations in some embodiments. Any suitable conveyor configuration may be used. In the illustrated example, the conveyors 120 may include belts or rollers.

A conveyor system as described herein may be used in conjunction with, or instead of, any of the main moving conveyor 150, the main split 160, the sort moving conveyors 170, the conveyors 120, or elsewhere. As a result, manual effort of managing item flow can be redirected to other tasks.

Embodiments of the disclosure include systems and methods for throttling of bulk material on conveyors. Certain embodiments may improve processing speed and/or throughput of fulfillment centers. Certain embodiments may improve performance of mechanical equipment for sortation and/or consolidation of items by reducing overloading and downtime. While described in the context of online orders, aspects of this disclosure are more broadly applicable to other forms of item flow management.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
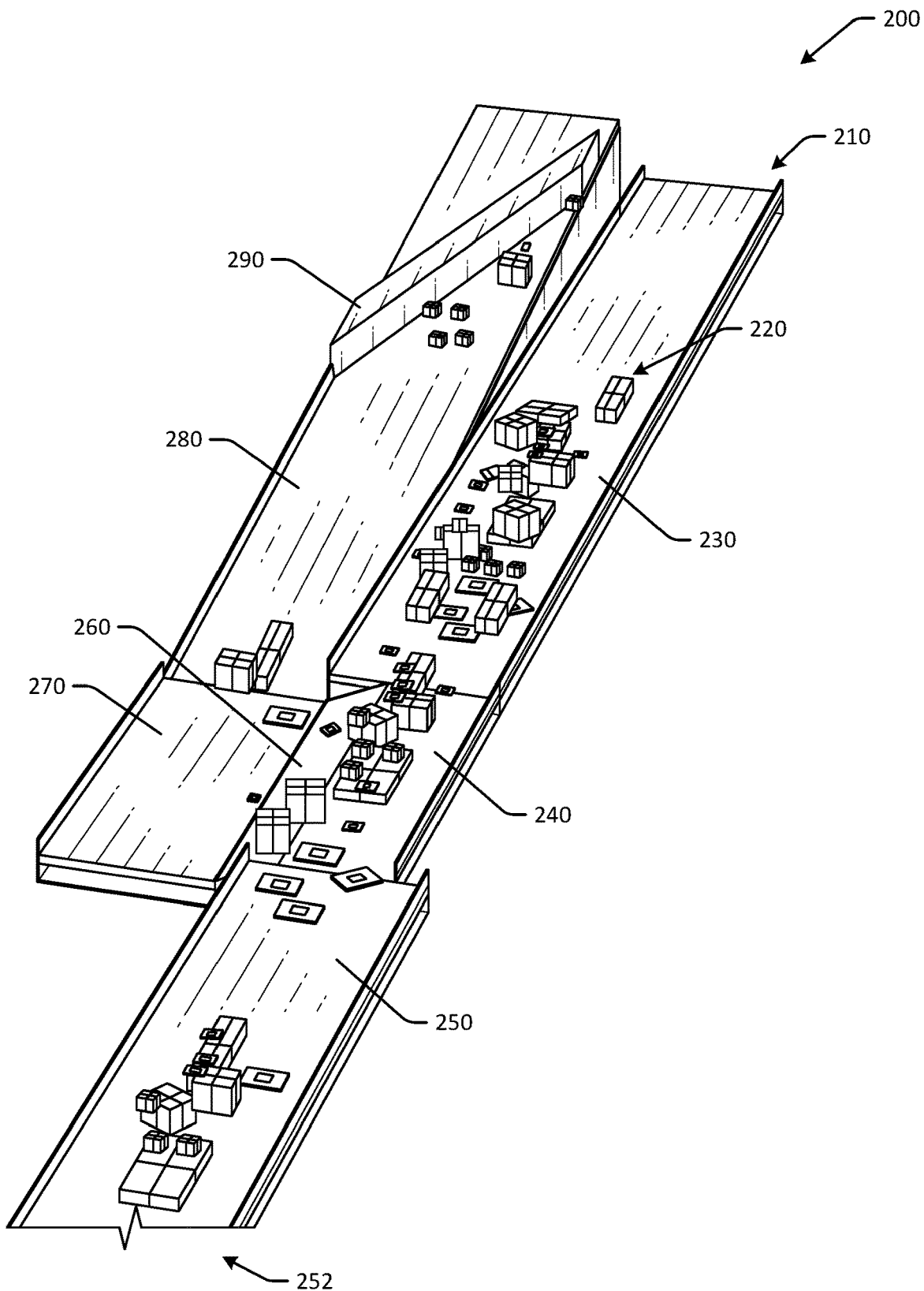
FIG. 2 is a schematic illustration of an example use case for passive throttling of bulk material on conveyor systems in accordance with one or more embodiments of the disclosure.

FIG. 2 is a schematic illustration of an example use case 200 for passive throttling of bulk material on conveyor systems in accordance with one or more embodiments of the disclosure. Other embodiments may include additional or fewer components. The illustration of FIG. 2 may not be to scale, and may not be illustrated to scale with respect to other figures.

In FIG. 2, a conveyor system 200 is depicted in perspective view. The conveyor system 200 may be disposed in any suitable facility, such as a fulfillment center, a sortation center, or other facility. In some embodiments, the conveyor system 200 may be disposed at or near an inbound portion of a facility, such as adjacent to an unloading dock. The conveyor system 200 may include one or more conveyor segments. In some instances, individual conveyor segments may have individual drive mechanisms, such as conveyor belts, drive rollers, etc. The different conveyor segments may be configured to move at the same speed or at different speeds than other segments of the conveyor system 200. In some embodiments, the individual speeds of the conveyor segments may be dynamically adjusted so as to provide spacing between objects moving along the conveyor system 200. The conveyor system 200 may be a conveyor system for bulk, or items that are to be moved in large quantities.

The conveyor system 200 may include a first conveyor 230, a second conveyor 240, a third conveyor 250, a fourth conveyor 270, and a fifth conveyor 280. Any number of conveyors or conveyor segments may be used. For example, the fourth conveyor 270 and the fifth conveyor 280 may be consolidated into a single conveyor. The different conveyors or conveyor segments may be used to passively throttle the flow of bulk materials moving along the conveyor system 200.

The first conveyor 230 may be an inbound or infeed conveyor. For example, items 220 on the conveyor system 200 may flow from an upstream process 210, such as a truck unloading process, onto the first conveyor 230 and to the other conveyors of the conveyor system 200. The items 220 may be unloaded or otherwise deposited onto the first conveyor 230 in bulk quantities without control or management of the flow or amount of items 220. For instance, containers of items 220 may be dumped onto the first conveyor 230.

As the items 220 flow along the first conveyor 230, the items 220 may approach the second conveyor 240. The second conveyor 240 may have a width that is narrower, or less than, a width of the first conveyor 230. For example, the first conveyor 230 may have a width of 60 inches, and the second conveyor 240 may have a width of 36 inches. In some embodiments, the second conveyor 240 may have a width that is equal to or greater than half the width of the first conveyor 230, and that is also narrower than the width of the first conveyor 230 (e.g., between 50-99% of the width of the first conveyor 230, etc.). An edge of the second conveyor 240 may be aligned with an edge of the first conveyor 230, as depicted in FIG. 2. Accordingly, items flowing along the edge of the first conveyor 230 may continue to flow along the aligned edge of the second conveyor 240.

Items may flow from the first conveyor 230 onto the second conveyor 240. However, due to the narrower width of the second conveyor 240, not all of the items on the first conveyor 230 may flow onto the second conveyor 240. Instead, a portion of the items 220 may fall onto a ramp or a chute 260 that is disposed adjacent to the second conveyor 240. The chute 260 may be dimensioned such that a horizontal space occupied by the chute 260 in addition to the width of the second conveyor 240 is equal to the width of the first conveyor 230. The chute 260 may be formed of a plastic, metal, composite, or other type of material, and may be disposed at an angle relative to the second conveyor 240.

A portion of the items 220 that does not fall onto the chute 260 from the first conveyor 230 may move onto the second conveyor 240. The second conveyor 240 may move the items to the third conveyor 250. However, as the items move along the second conveyor 240, some of the items may fall down the chute 260. Accordingly, a portion of the items that were moving along the second conveyor 240 may be moved onto the third conveyor 250. The third conveyor 250 may be a discharge conveyor that transports the items to a downstream process 252, such as a sortation process, a singulation process, a decluttering process, and/or another process. The first conveyor 230, second conveyor 240, and the third conveyor 250 may all move in the same direction at the same or different speeds. The first conveyor 230, second conveyor 240, and the third conveyor 250 may all be disposed at the same or at different vertical heights. The second conveyor 240 may be offset with respect to the first conveyor 230. For example, a central axis of the second conveyor 240 may be offset with respect to a central axis of the first conveyor 230. In contrast, a central axis of the third conveyor 250 may be aligned with respect to the central axis of the second conveyor 240. In some embodiments, edges of the third conveyor 250 may be aligned with edges of the first conveyor 230 and second conveyor 240, whereas in other embodiments, such as the illustrated embodiment, edges of the third conveyor 250 may not be aligned with the edges of the second conveyor 240, although the central axes of the second conveyor 240 and the third conveyor 250 may be aligned.

Items that fall onto the chute 260 from either the first conveyor 230 or the second conveyor 240 may fall onto the fourth conveyor 270. The fourth conveyor 270 may therefore be disposed at a lower vertical position relative to the second conveyor 240. The fourth conveyor 270 may move in the opposite direction of the first conveyor 230. Items may be moved from the fourth conveyor 270 onto the fifth conveyor 280. The fifth conveyor 280 may move in the same direction as the fourth conveyor 270. However, the fifth conveyor 280 may be disposed at an angle, such that items moving along the fifth conveyor 280 may be moving at an incline relative to the first conveyor 230. For instance, the first conveyor 230, second conveyor 240, the third conveyor 250, and the fourth conveyor 270 may all be flat conveyors, and the fifth conveyor 280 may be angled. Accordingly, items flowing along the fifth conveyor 280 may be elevated with respect to items flowing on the first conveyor 230.

The conveyor system 200 may include a boom or an arm 290 that is disposed at an angle across the fifth conveyor 280. As items move along the fifth conveyor 280, the items may contact the arm 290. The arm 290 may guide the items off of the fifth conveyor 280, and the items may fall onto the first conveyor 230. The items may then again move from the first conveyor 230 onto the second conveyor 240, or may again fall down the chute 260. The items may continually be processed in this manner until all of the items have been transferred from the first conveyor 230 to the third conveyor 250.

In some embodiments, the angle of the arm 290 may be fixed, whereas in other embodiments the angle may be adjustable. For example, the angle of the arm 290 may be adjusted to increase or decrease based on how many items are on the first conveyor 230. If there is a relatively high amount of items on the first conveyor 230, the angle of the arm 290 may be increased such that items spend more time on the fifth conveyor 280 before falling onto the first conveyor 230, whereas if there is a relatively low amount of items on the first conveyor 230, the angle of the arm 290 may be decreased such that items spend less time on the fifth conveyor 280 before falling onto the first conveyor 230.

Accordingly, the conveyor system 200 may be used to passively throttle the flow of bulk items along the conveyor system. As items flow from the first conveyor 230, a portion of the items are transferred onto the second conveyor 240, and a portion of items are guided down the chute 260. As items flow along the second conveyor 240, some or all of the items are transferred to the third conveyor 250 and subsequently to a downstream process. Items not transferred from the second conveyor 240 to the third conveyor 250 are also guided down the chute 260. Items guided down the chute 260 are transferred onto the fourth conveyor 270, and then onto the fifth conveyor 280. Items on the fifth conveyor 280 are moved at an incline until the items are guided off of the fifth conveyor 280 and back onto the first conveyor 230 via the arm 290.

Sizing or dimensions of the conveyor system 200 may be determined based at least in part on maximum possible throughput, in a burst scenario, that could be created by the upstream processes as well as how long that burst could be sustained. Belt widths and speeds can be used to control the items per minute that are allowed to flow.

Accordingly, the conveyor system 200 may include the first conveyor 230 having a first width, and the second conveyor 240 having a second width, the second conveyor 240 disposed adjacent to the first conveyor 230. The second width may be at least half of the first width. The conveyor system 200 may include the third conveyor 250 disposed adjacent to the second conveyor 240, and the chute 260. The chute 260 may be coupled to a side of the second conveyor 240. The conveyor system 200 may include the fourth conveyor 270, where items falling from the second conveyor 240 are guided onto the fourth conveyor 270 via the chute 260. The first conveyor 230, the second conveyor 240, and the third conveyor 250 may move in a first direction, and the fourth conveyor 270 and/or the fifth conveyor 280 may move in a second direction. The second direction may be opposite the first direction. The conveyor system 200 may include the fifth conveyor 280 disposed adjacent to the fourth conveyor 270, where the fifth conveyor 280 may be positioned at an incline relative to the first conveyor 230. The fourth conveyor 270 may be disposed vertically lower than the second conveyor 240, and may be vertically higher than an end of the fifth conveyor 280, such that items drop from the fourth conveyor 270 onto the fifth conveyor 280. The conveyor system 200 may include the arm 290 that is disposed transverse the fifth conveyor 280, where the arm 290 guides items from the fifth conveyor 280 onto the first conveyor 230. An angle of the arm 290 may be dynamically adjustable.

In some embodiments, conveyor systems may include one or more sensors, such as photo eyes, cameras, or other sensors configured to image or otherwise sense the first conveyor 230, and a controller configured to adjust the angle of the arm 290 based at least in part on feedback from the sensor. For instance, the conveyor system 200 may include an overhead assembly where one or more sensors or camera systems may be mounted to the overhead assembly. In one example embodiment, the sensors may be used to generate images or point cloud representations that can be used to determine and/or track object location. For example, the point cloud representation may be generated by a three-dimensional camera system and may be a representation of the arrangement and location of objects on the first conveyor 230. The point cloud representation may be used to determine or detect spaces on the first conveyor 230, determine a load or a number of items on the first conveyor 230, and so forth. Such information may be used to adjust conveyor speeds and/or angle of the arm 290 to provide active control of throttling in some embodiments.

Embodiments may be configured to have the recirculation line (e.g., fourth conveyor and/or fifth conveyor, etc.) routed to a different part of the facility than the third conveyor, such as further upstream than depicted (e.g., prior to infeed, etc.) or to a different downstream processing system (e.g., a different sortation system housed in the same operation, etc.). Other embodiments may include recirculating components that may have reverse accumulation logic (e.g., inch-and-store, etc.) as well as opportunity merge logic applied to the recirculation portion such that the amount of buffer provided during a burst is increased.

Embodiments of the disclosure avoid potential issues related to overflow of system processes, as well as potential issues related to cluttered items. As a result, throughput may be increased and sortation accuracy may be increased.

Figure 3:
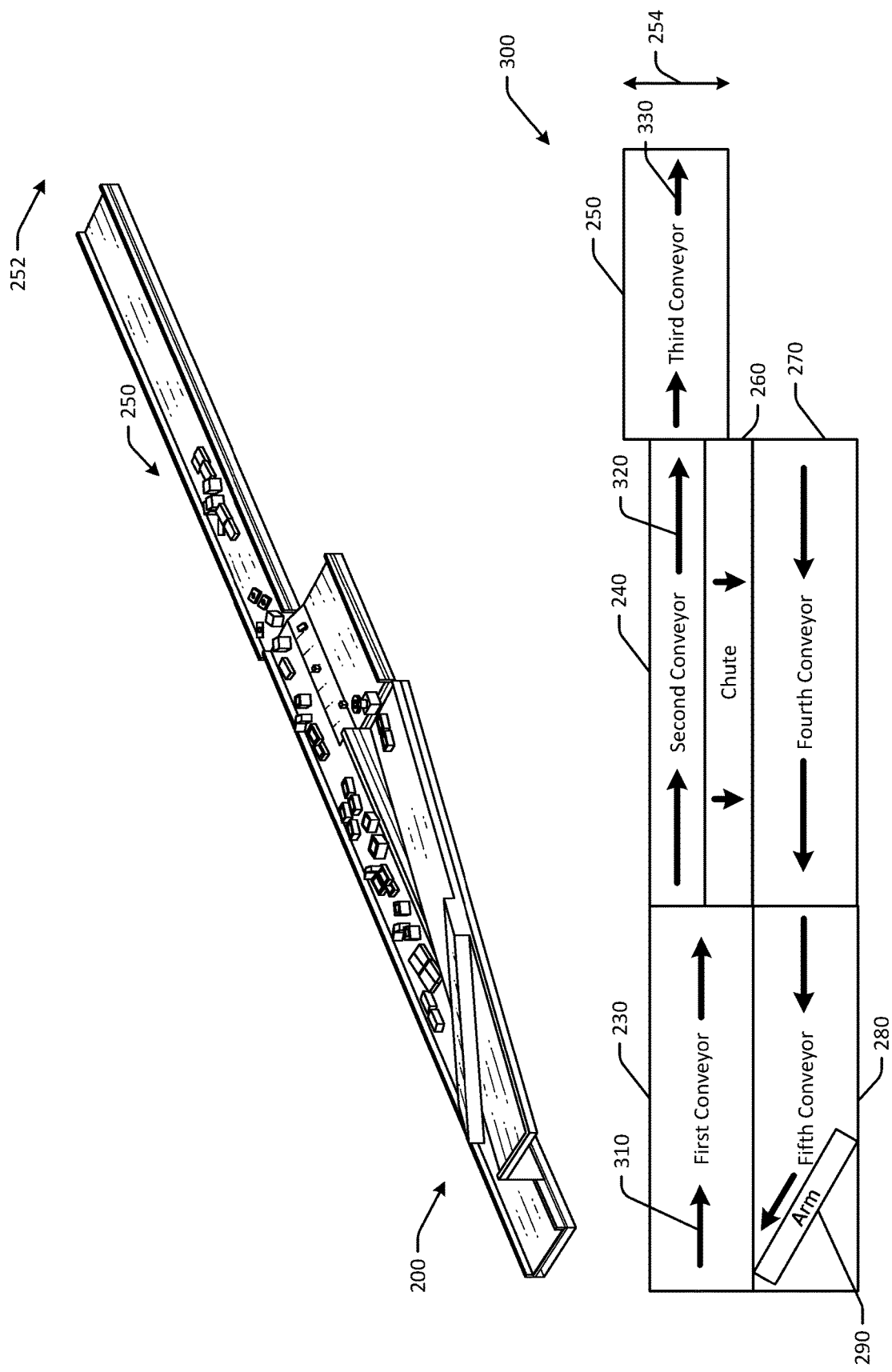
FIG. 3 is a schematic illustration of the conveyor system of FIG. 2 in perspective and top views in accordance with one or more embodiments of the disclosure.

FIG. 3 is a schematic illustration of the conveyor system of FIG. 2 in perspective and top views in accordance with one or more embodiments of the disclosure. Other embodiments may include additional or fewer components. The illustration of FIG. 3 is not to scale, and may not be illustrated to scale with respect to other figures.

In FIG. 3, the conveyor system 200 of FIG. 2 is depicted in perspective view. A schematic illustration 300 of the conveyor system 200 is also depicted in FIG. 3. As illustrated by arrows in FIG. 3, as items flow from the first conveyor 230, a portion of the items are transferred onto the second conveyor 240, and a portion of items are guided down the chute 260. As items flow along the second conveyor 240, some or all of the items are transferred to the third conveyor 250 and subsequently to a downstream process. Items not transferred from the second conveyor 240 to the third conveyor 250 are also guided down the chute 260. Items guided down the chute 260 are transferred onto the fourth conveyor 270, and then onto the fifth conveyor 280. Items on the fifth conveyor 280 are moved at an incline until the items are guided off of the fifth conveyor 280 and back onto the first conveyor 230 via the arm 290.

Also depicted in FIG. 3 is a central axis 310 of the first conveyor 230 that is offset with respect to a central axis 320 of the second conveyor 240. The central axis 320 of the second conveyor 240 is aligned with a central axis 330 of the third conveyor 250. In addition, a width 254 of the third conveyor 250 may be greater than the second conveyor 240 and/or equal to the width of the first conveyor 230.

Figure 4:
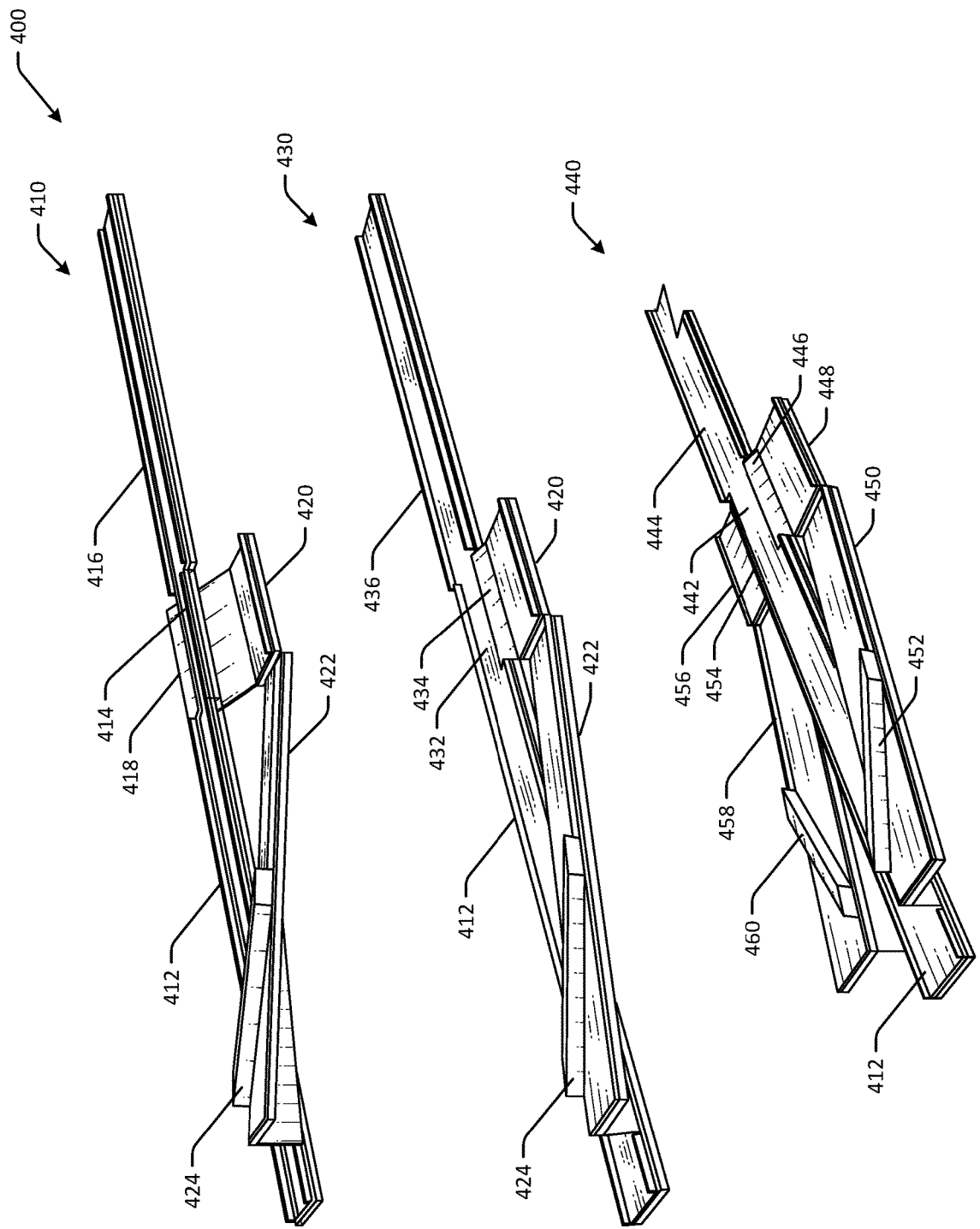
FIG. 4 is a schematic illustration of a number of embodiments of conveyor systems for passive throttling of bulk material in accordance with one or more example embodiments of the disclosure.

FIG. 4 depicts a schematic illustration of a number of embodiments of conveyor systems 400 for passive throttling of bulk material in accordance with one or more example embodiments of the disclosure. While example embodiments of the disclosure may be described in the context of objects, such as packages, it should be appreciated that the disclosure is more broadly applicable to any type of object, such as items, products, containers, bags of products, and so forth.

A first conveyor system 410 differs from the conveyor system depicted in FIGS. 2-3 due to placement of the chute and positioning of the fourth conveyor. The first conveyor system 410 includes a first conveyor 412, a narrow second conveyor 414, a third conveyor 416, a chute 418, a fourth conveyor 420, a fifth conveyor 422, and an arm 424. However, the chute 418 may be disposed under the second conveyor 414, instead of adjacent to the second conveyor 414. The second conveyor 414 may therefore be disposed over the chute 418 (e.g., over a middle portion of the chute, etc.). For example, the chute 418 may be coupled to the first conveyor 412. In this embodiment, items may fall from either side of the narrow second conveyor 414 onto the chute 418, and then onto the fourth conveyor 420. This embodiment may require additional vertical space to implement relative to other embodiments.

A second conveyor system 430 differs from the conveyor system depicted in FIGS. 2-3 due to vertical separation between the fourth conveyor and the fifth conveyor. The second conveyor system 430 includes the first conveyor 412, a narrow second conveyor 432, a third conveyor 436, a chute 434, a fourth conveyor 420, a fifth conveyor 422, and an arm 424. However, the fourth conveyor 420 may be elevated with respect to an end of the fifth conveyor 422, such that items may fall from the fourth conveyor 420 onto the fifth conveyor 422. This embodiment may be more compact than the first embodiment 410.

A third conveyor system 440 is similar to the second conveyor system 430, but includes a mirrored chute configuration on both sides of the narrow conveyor. The third conveyor system 440 includes the first conveyor 412, a narrow second conveyor 442, a third conveyor 444, a first chute 446, a right side fourth conveyor 448, a right side fifth conveyor 450, a right side arm 452, a second chute 454, a left side fourth conveyor 456, a left side fifth conveyor 458, and a left side arm 460. Both fourth conveyors 448, 456 may be elevated with respect to ends of the respective fifth conveyors 450, 458. This embodiment may provide added capacity, as well as the ability to route items to different downstream stations.

Figure 5:
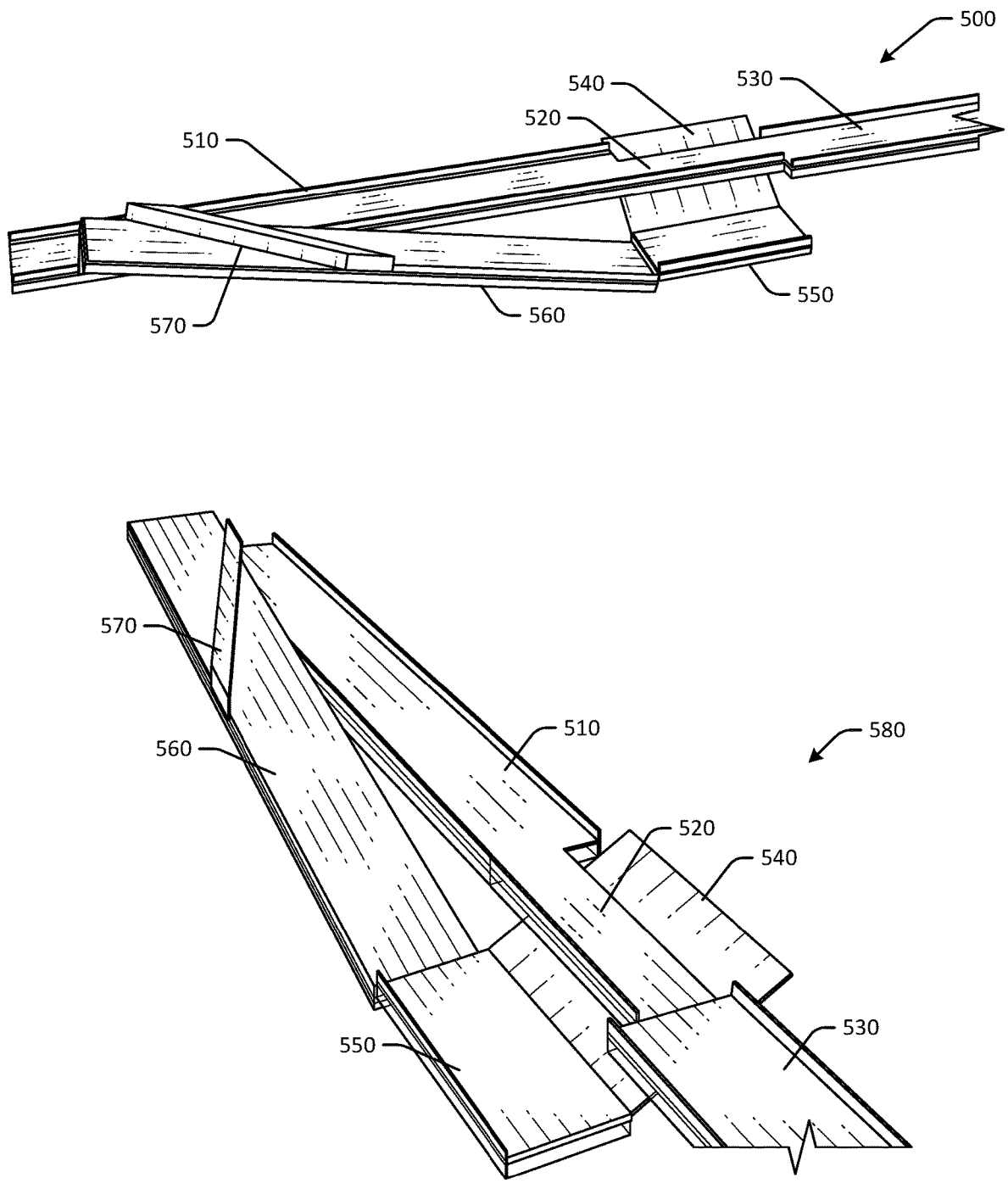
FIG. 5 is a schematic illustration of a conveyor system for passive throttling of bulk material in accordance with one or more example embodiments of the disclosure.

FIG. 5 is a schematic illustration of a conveyor system for passive throttling of bulk material in accordance with one or more example embodiments of the disclosure. Other embodiments may include additional or fewer components. The illustration of FIG. 5 is not to scale, and may not be illustrated to scale with respect to other figures.

In FIG. 5, a conveyor system 500 similar to the first embodiment 410 of the conveyor system as illustrated in FIG. 4 is depicted in a first perspective view and a second perspective view 580. The conveyor system 500 of FIG. 5 may include a first conveyor 510, a narrow second conveyor 520, a third conveyor 530, a chute 540, a fourth conveyor 550, a fifth conveyor 560, and an arm 570. The chute 540 may be disposed at least partially under the second conveyor 520. The second conveyor 520 may therefore be disposed at least partially over both the chute 540 and the fourth conveyor 550. For example, the chute 540 may be coupled to the first conveyor 510. The fourth conveyor 550 may be disposed at least partially under the second conveyor 520. The fifth conveyor 560 may therefore be at an angle, or otherwise transverse to, the fourth conveyor 550 and/or the other conveyors in the conveyor system 500. In this embodiment, items may fall from either side of the narrow second conveyor 520 onto the chute 540, and then onto the fourth conveyor 550.

Figure 6:
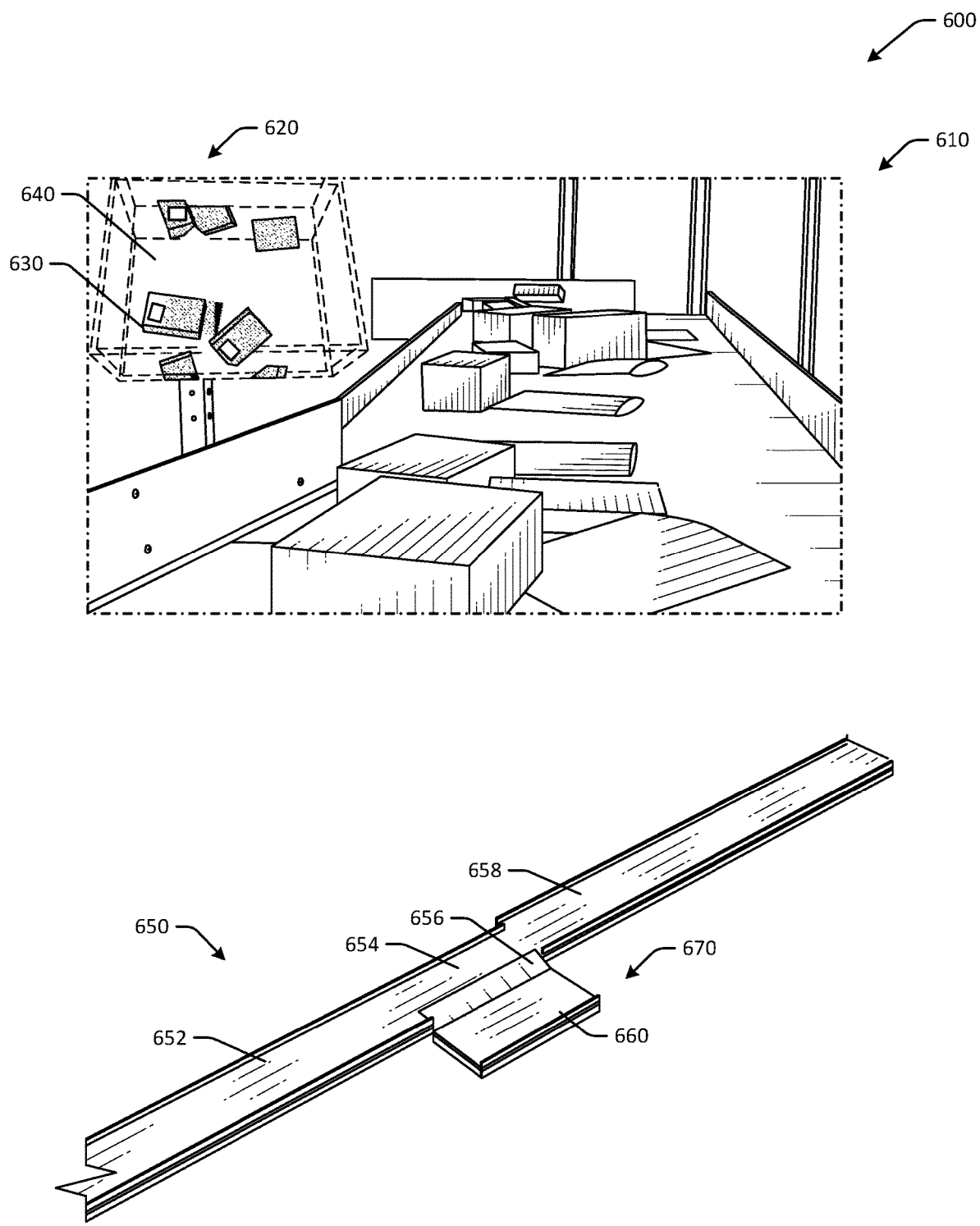
FIG. 6 is a schematic illustration of an example use case for sensor-based control of a conveyor arm for throttling of bulk material on conveyor systems in accordance with one or more embodiments of the disclosure.

FIG. 6 is a schematic illustration of an example use case 600 for sensor-based control of a conveyor arm for throttling of bulk material on conveyor systems in accordance with one or more embodiments of the disclosure. Other embodiments may include additional or fewer components. The illustration of FIG. 6 is not to scale, and may not be illustrated to scale with respect to other figures. The system illustrated in FIG. 6 may be used with the same conveyor systems discussed with respect to FIGS. 1-5.

In FIG. 6, one or more overhead sensors 610, such as cameras, may be used in conjunction with a computer system to identify gaps or spacing between items moving along a conveyor, such as an inbound conveyor. The sensors 610 may provide image data that allows for detection of spaces between items along a conveyor. If space is detected, the computer system or controller may cause an angle of a boom or arm to decrease, so as to push items off of a fifth conveyor segment onto the first conveyor segment (e.g., the inbound conveyor, etc.). If no space is detected, the computer system or controller may cause the angle of the boom or arm to increase, so as to avoid or delay items falling off the fifth conveyor segment onto items moving along the first conveyor segment. In some instances, conveyor speeds may be modified instead of moving the arm or changing an angle of the arm. For example, a speed of the fifth conveyor segment may be increased responsive to a detection of space, so as to quickly drop items into the space. In contrast, speed of the fifth conveyor segment may be reduced if no space is detected.

An example image 620 is depicted in FIG. 6. The image 620 may be generated using one or more sensors, such as the overhead sensor 610, disposed about the conveyor system. The image 620 may be processed to determine the presence of a space 640 between items 630 moving along the conveyor. To determine the presence of space 640, the image 620 may be processed using computer vision or other image recognition algorithms.

In one embodiment, an overhead camera assembly may be used to generate a point cloud representation of the packages or other items as they pass under the camera assembly. In the point cloud representation, a number of packages may be identified, as well as spaces of a certain size or dimension between the packages. Point cloud representations may be used in conjunction with conveyor encoder readings to determine and/or track object location as the conveyor and/or object moves downstream. The point cloud representation may be pre-processed by the sortation system by, for example, applying a Gaussian filter and removing any clusters outside of a region of interest. Some embodiments may implement a two-staged three-dimensional segmentation. The first-stage segmentation may use a smooth region growing technique based on surface curvature and normal differences in the point cloud. Although the first-stage segmentation may be sufficient for boxes or other rectangular object, under-segmentation may occur for highly cluttered flat packages, due to connected three-dimensional clusters. Some embodiments may compute the ratio of the segment pixel volume and the corresponding convex hull volume as a confidence score. The confidence score may be representative of a likelihood that the segment corresponds to a single object. When this confidence score is below a threshold, the second-stage segmentation can be applied using the non-smooth region growing technique where the surface curvature and normal differences are compared with the original segment seed point instead of their nearest neighbors. This two-stage segmentation approach separates overlapping thin packages while avoiding over-segmentation on bulky and/or curvy packages.

FIG. 6 further depicts an example of a conveyor system 650 that may be similar to the conveyor system depicted in FIG. 2. For example, the conveyor system 650 may include an inbound portion 652, a narrow portion 654, a chute 656 disposed adjacent to the narrow portion 654, and an offset portion 658 downstream from the narrow portion 654. The narrow portion 654 may have a narrower width than the inbound portion 652. The offset portion 658 may have a central axis that is offset with respect to a central axis of the narrow portion 654. Some or all of the portions may include individually driven rollers, belts, or other conveyance surfaces.

Items that slide down the chute 656 may land on a conveyor segment 660. However, unlike the embodiment of FIG. 2, the conveyor segment 660 may not lead to a return path for items to the inbound portion 652. Instead, the conveyor segment 660 may lead to a different downstream process, a different sortation line, or other equipment, and may serve to effectively split the inbound bulk items into two separate processing lines. In other embodiments, the conveyor segment 660 may lead to a manual handling process station, an item holding station, or other type of processing station.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted or described orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
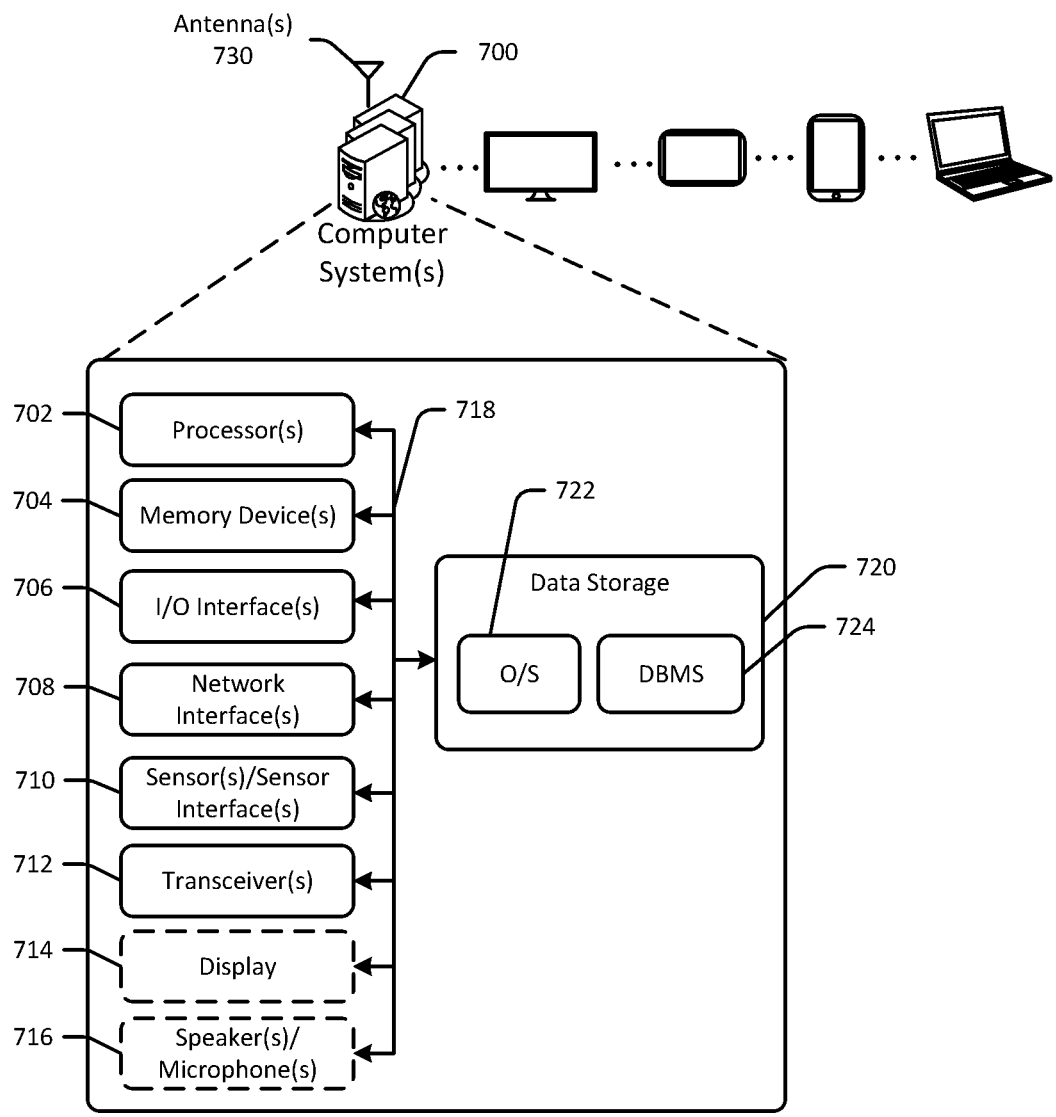
FIG. 7 schematically illustrates an example architecture of a computer system associated with a conveyor system for passive throttling of bulk material in accordance with one or more embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for the device(s) of FIGS. 1-6. For example, the computer system(s) 700 may be a controller and may control one or more aspects of the throttling of bulk material on conveyor systems system described in FIGS. 1-6, such as control of the arm angle, etc.

The computer system(s) 700 may be configured to communicate with one or more servers, user devices, or the like. The computer system(s) 700 may be configured to identify items, control operation of equipment, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11 ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s)

of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A bulk material conveyor system comprising:
   a first conveyor having a first width, the first conveyor configured to transport inbound bulk material from a dock to a downstream processing station;
   a second conveyor having a second width that is half the first width, the second conveyor disposed adjacent to the first conveyor;
   a third conveyor having a third width that is greater than the second width, the third conveyor disposed adjacent to the second conveyor;
   a chute having a fourth width that is half the first width, the chute disposed adjacent to the second conveyor;

a fourth conveyor, wherein items falling from the second conveyor are guided to the fourth conveyor via the chute; and a fifth conveyor disposed adjacent to the fourth conveyor, wherein the fifth conveyor is positioned at an incline relative to the first conveyor;

wherein the first conveyor, the second conveyor, and the third conveyor move in a first direction, and wherein the fourth conveyor and the fifth conveyor move in a second direction that is opposite the first direction.

2. The bulk material conveyor system of claim 1, wherein a central axis of the second conveyor is offset with respect to a central axis of the first conveyor, and wherein a central axis of the third conveyor is aligned with respect to the central axis of the second conveyor.

3. The bulk material conveyor system of claim 1, further comprising:

an arm disposed transverse the fifth conveyor, wherein the arm guides items from the fifth conveyor onto the first conveyor.

4. The bulk material conveyor system of claim 3, further comprising:

a sensor configured to image the first conveyor; and a controller configured to adjust an angle of the arm based at least in part on feedback from the sensor.

5. A conveyor system comprising:

a first conveyor having a first width;

a second conveyor having a second width that is at least half of the first width, the second conveyor disposed adjacent to the first conveyor;

a third conveyor having a third width that is greater than the second width, the third conveyor disposed adjacent to the second conveyor;

a chute having a fourth width, the chute disposed adjacent to the second conveyor, wherein the second width and the fourth width together are equal to the first width; and a fourth conveyor, wherein items falling from the second conveyor are guided onto the fourth conveyor via the chute;

wherein the first conveyor, the second conveyor, and the third conveyor move in a first direction, and wherein the fourth conveyor moves in a second direction.

6. The conveyor system of claim 5, wherein a central axis of the second conveyor is offset with respect to a central axis of the first conveyor.

7. The conveyor system of claim 6, wherein a central axis of the third conveyor is aligned with respect to the central axis of the second conveyor.

8. The conveyor system of claim 5, further comprising:

a fifth conveyor disposed adjacent to the fourth conveyor, wherein the fifth conveyor is positioned at an incline relative to the first conveyor.

9. The conveyor system of claim 8, wherein the fourth conveyor is disposed vertically lower than the second conveyor, and vertically higher than an end of the fifth conveyor.

10. The conveyor system of claim 8, further comprising:

an arm disposed transverse the fifth conveyor, wherein the arm guides items from the fifth conveyor onto the first conveyor.

11. The conveyor system of claim 10, wherein an angle of the arm is dynamically adjustable.

12. The conveyor system of claim 11, further comprising:

a sensor configured to image the first conveyor; and a controller configured to adjust the angle of the arm based at least in part on feedback from the sensor.

13. The conveyor system of claim 5, wherein the chute is coupled to a side of the second conveyor.

14. The conveyor system of claim 5, wherein the second conveyor is disposed over a middle portion of the chute.

15. The conveyor system of claim 5, wherein the second direction is opposite the first direction.

16. A conveyor system comprising:

a first conveyor, the first conveyor having a first width;

a second conveyor disposed adjacent to the first conveyor, the second conveyor having a second width that is at least half of the first width;

a third conveyor disposed adjacent to the second conveyor, the third conveyor having a third width that is greater than the second width;

a chute having a fourth width, the chute disposed adjacent to the second conveyor, wherein the second width and the fourth width together are equal to the first width; and a fourth conveyor, wherein items falling from the second conveyor are guided onto the fourth conveyor via the chute;

wherein the first conveyor, the second conveyor, and the third conveyor move in a first direction, and wherein the fourth conveyor moves in a second direction that is opposite the first direction.

17. The conveyor system of claim 16, wherein a central axis of the second conveyor is offset with respect to a central axis of the first conveyor, and wherein a central axis of the third conveyor is aligned with respect to the central axis of the second conveyor.

18. The conveyor system of claim 16, further comprising:

a fifth conveyor disposed adjacent to the fourth conveyor, wherein the fifth conveyor is positioned at an incline relative to the first conveyor.

* * * * *